US009491401B2

(12) United States Patent
Do et al.

(10) Patent No.: US 9,491,401 B2
(45) Date of Patent: Nov. 8, 2016

(54) VIDEO CALL METHOD AND ELECTRONIC DEVICE SUPPORTING THE METHOD

(71) Applicant: Samsung Electronics Co., Ltd., Gyeonggi-do (KR)

(72) Inventors: Taewon Do, Gyeonggi-do (KR); Kyuhan Kang, Gyeonggi-do (KR); Kichoon Gong, Seoul (KR); Sangki Kang, Gyeonggi-do (KR); Sangwook Shin, Seoul (KR); Sungwan Youn, Seoul (KR); Chulhwan Lee, Seoul (KR); Woonhyun Jung, Gyeonggi-do (KR); Hyunil Cho, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/462,139

(22) Filed: Aug. 18, 2014

(65) Prior Publication Data

US 2014/0368600 A1 Dec. 18, 2014

(30) Foreign Application Priority Data

Aug. 16, 2013 (KR) ........................ 10-2013-0096993

(51) Int. Cl.
*H04N 7/14* (2006.01)
*G06K 9/00* (2006.01)

(52) U.S. Cl.
CPC .......... *H04N 7/141* (2013.01); *G06K 9/00221* (2013.01); *G06K 9/00912* (2013.01)

(58) Field of Classification Search
CPC ...................................................... H04N 7/14
USPC ......... 348/14.01, 14.02, 14.03, 14.07, 14.12, 348/14.16

See application file for complete search history.

(56) References Cited

U.S. PATENT DOCUMENTS

| 2006/0152578 | A1* | 7/2006 | Kim | ...................... H04N 7/147 348/14.01 |
| 2009/0315973 | A1* | 12/2009 | Izotov | ................... H04L 65/403 348/14.07 |
| 2011/0249073 | A1* | 10/2011 | Cranfill | ................... H04N 7/147 348/14.02 |
| 2014/0049595 | A1* | 2/2014 | Feng | ........................ H04N 7/15 348/14.08 |
| 2015/0271444 | A1* | 9/2015 | DeFazio | ................ H04N 7/141 348/14.07 |

FOREIGN PATENT DOCUMENTS

KR 102011005227 5/2011

* cited by examiner

*Primary Examiner* — Olisa Anwah
(74) *Attorney, Agent, or Firm* — The Farrell Law Firm, P.C.

(57) ABSTRACT

A video call method is provided, including forming a video call channel in an electronic device, outputting a screen including a first image received through the video call channel, determining whether a second image being transmitted through the video call channel is displayed on the screen based on image information of the second image, and displaying the second image on the screen according to the determination, and an electronic device supporting the video call method.

19 Claims, 8 Drawing Sheets

VIDEO CALL METHOD AND ELECTRONIC DEVICE SUPPORTING THE METHOD

PRIORITY

This application claims priority under 35 U.S.C. §119(a) to Korean Patent Application No. 10-2013-0096993 filed on Aug. 16, 2013, the contents of which are incorporated herein by reference.

BACKGROUND OF THE INVENTION

1. Field of the Invention

The present invention relates generally to a video call, and more particularly, to a video call method capable of seeing an enhanced face and an electronic device supporting the method.

2. Description of the Related Art

The portable terminal has dramatically grown in popularity in recent years, and currently tends to feature a touch screen, hardware and software capable of providing various contents, and a camera for photographing of an image. Users may photograph an image by using the camera, store and edit the photographed image, and transmit the photographed image to another terminal. However, conventional portable terminals suffer from a video call method that is difficult in viewing a face of another user.

SUMMARY OF THE INVENTION

The present invention has been made in an effort to address the above problem and it is an aspect of the present invention to provide present invention a video call method capable of easily viewing a face of another user in a video call process, and an electronic device supporting the method.

According to an aspect of the present invention, a video call method includes forming a video call channel in an electronic device, outputting a screen including a first image received through the video call channel, determining whether a second image being transmitted through the video call channel is displayed on the screen based on image information of the second image, and displaying the second image on the screen according to the determination.

According to another aspect of the present invention, a video call method includes forming a video call channel in an electronic device, outputting a screen including a first image received through the video call channel, determining a display position of a second image being transmitted through the video call channel based on image information of the first image, and displaying the second image in the determined position.

According to another aspect of the present invention, an electronic device includes a communication module configured to form a video call channel, a display module configured to output a screen including a first image received based on the video call channel, and a control module configured to check whether a second image being transmitted based on the video call channel is displayed, and controls the display of the second image according to whether the second image is displayed.

According to another aspect of the present invention, an electronic device includes a communication module configured to form a video call channel, a control module that determines a display position of a second image being transmitted through the video call channel based on image information of the first image received through the video call channel, and a display module that displays the second image in the determined position.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE INVENTION

Figure 1:
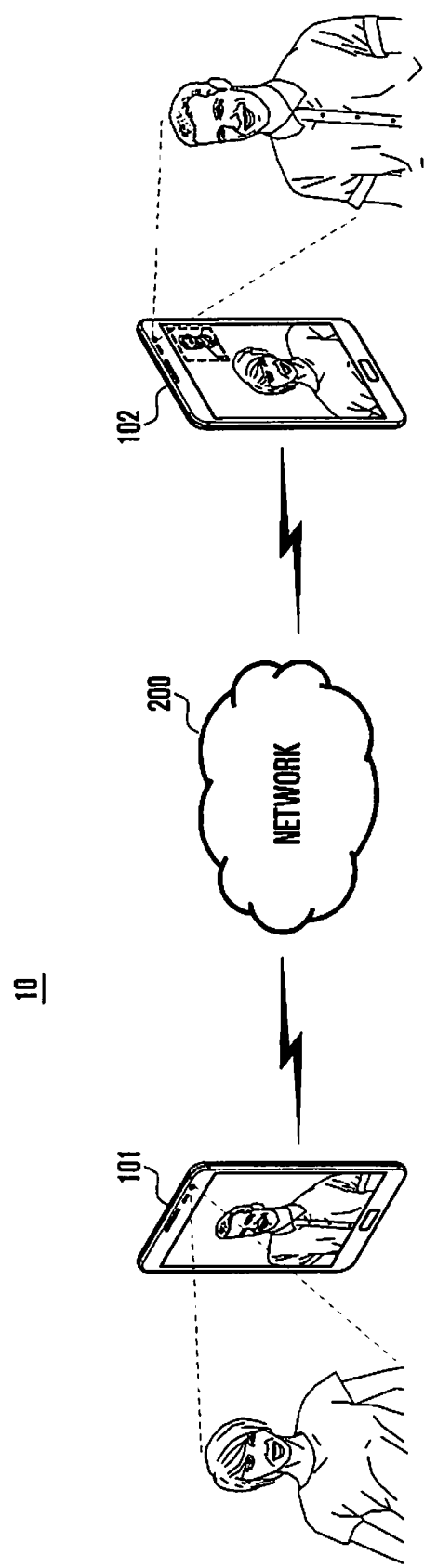
FIG. 1 illustrates a configuration of a system in which a video call function is supported according to the present invention.

Embodiments of the present invention will be described in detail with reference to the accompanying drawings. The same or similar components is designated by the same or similar reference numerals although they are illustrated in different drawings. Detailed descriptions of constructions or processes known in the art is omitted to avoid obscuring the subject matter of the present invention.

In the accompanying drawings, some components is exaggerated, omitted, or schematically illustrated, and a size of each component may not precisely reflect the actual size thereof. Thus, the present invention is not limited by the relative size or space drawn in the accompanying drawings.

FIG. 1 illustrates a configuration of a video call system 10 according to an embodiment of the present invention;

Referring to FIG. 1, the video call system 10 includes a first electronic device 101, a second electronic device 102 and a network device 200.

In the video call system 10, for example, the first electronic device 101 transmits a video call request message to the second electronic device 102 through the network device 200. When the second electronic device 102 receives the video call request message from the first electronic device 101, the second electronic device 102 outputs an alarm for the video call request through, for example, a display module or an audio process module. When a user accepts a video call connection, the second electronic device 102 transmits a video call connection acceptance message to the first electronic device 101 through the network device 200.

When a video call channel between the first electronic device 101 and the second electronic device 102 is formed, the first electronic device 101 transmits an image collected by a camera to the second electronic device 102 through the network device 200. The second electronic device 102 also transmits an image collected by a camera to the first electronic device 101 through the network device 200. In this operation, the first electronic device 101 outputs the image collected by the camera thereof to a display module, and the second electronic device 102 outputs the image collected by the camera thereof to the display module.

According to an embodiment, the first electronic device 101 determines whether the first electronic device 101 displays a second image being transmitted to the second electronic device 102 in an area other than a face area of a first image. For example, the first image is of a counterpart, and the second image is collected by the first electronic device 101. In addition, the first electronic device 101 displays the second image in a predetermined size on a screen where the first image is displayed, according to the determination of the display of the image.

Alternatively, the first electronic device 101 outputs at least a partial image thereof on the screen where the first image transmitted from the second electronic device 102 is displayed, during a predetermined time and interval. The electronic device 101 outputs the image thereof together with the first image transmitted from the second electronic device 102 during an initial predetermined time, and omits the image thereof while maintaining the output of the first image after a predetermined time.

The first electronic device 101 and the second electronic device 102 output only reference information informing of an image, which is transmitted to a counterpart electronic device to be displayed in a corresponding electronic device, in display modules thereof. The first electronic device 101 and the second electronic device 102 output guide information such that the images thereof are positioned in a reference area defined by the reference information. The reference area is correspond to a border area of a preview image of a speaker to be displayed in the display module.

At least one electronic device of the first electronic device 101 and the second electronic device 102 supports a user to more accurately visualize a counterpart's face by operating at least one manner among the previously described display manners. Therefore, the video call system 10 of the present invention supports clear viewing of a counterpart's face without being hampered by an obstacle, which is a basic function of a video call. At least one of the first electronic device 101 and the second electronic device 102 may apply the video call from a time point when a camera 170 is activated or when a counterpart's image is output by attempting the video call related to the image output control of the previously described speaker.

In an embodiment, the first electronic device 101 photographs the second image corresponding to the image thereof and outputs only the first image corresponding to a counterpart's image provided from the second electronic device 102 to the display module while transmitting the second image to the second electronic device 102, rather than outputting the second image corresponding to the image thereof to the display module. In another embodiment, the second electronic device 102 displays the first image corresponding to the image of a speaker thereof to one side of the screen while outputting the second image corresponding to a counterpart's image provided from the first electronic device 101 to the display module. The second electronic device 102 processes such that the image thereof does not overlap a face area of the a counterpart's image. To this end, the second electronic device 102 performs facial recognition on the counterpart's image displayed in the display module, and control to adjust and determine a size and a position of the image thereof.

The second electronic device 102 outputs the image thereof by adjusting the transparency of the image thereof. Alternatively, the second electronic device displays the image thereof during only a predetermined time in the video call process, and removes the image thereof from the display module after the predetermined time, as described above.

A specific electronic device in the video call system according to an embodiment of the present invention performs an operation of forming a video call channel with another electronic device, and an operation of outputting a screen including a counterpart's image provided from the another electronic device. At least a portion of a preview image of a speaker is removed from the screen or the preview image of the speaker is removed during at least a predetermined time in the screen. Therefore, the video call system 10 supports so as to perform the video call while fully viewing only the counterpart's image.

Figure 2:
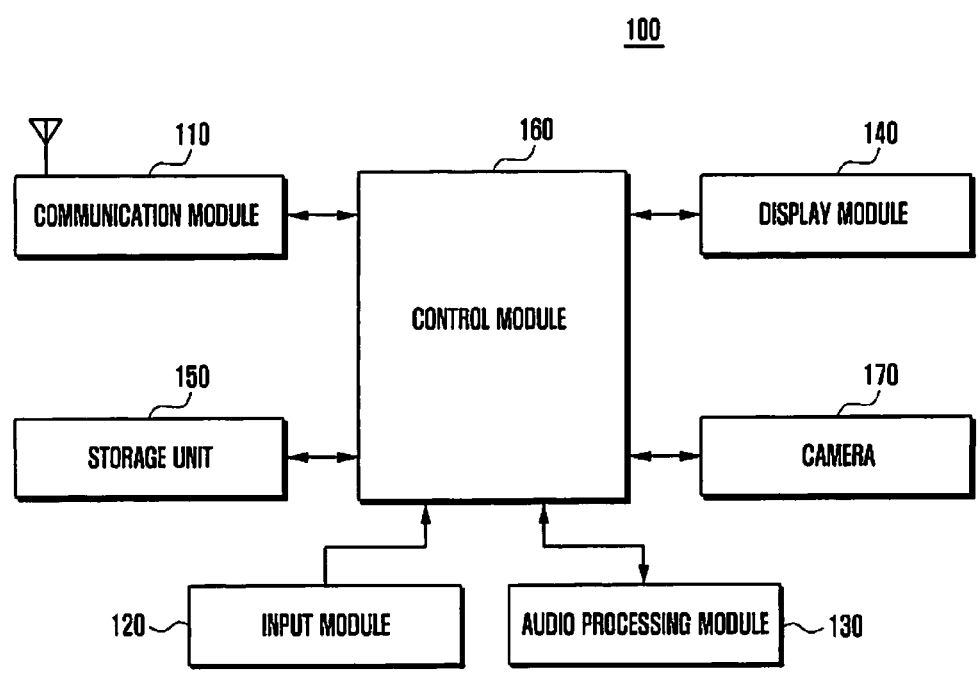
FIG. 2 illustrates a configuration of an electronic device according to an embodiment of the present invention.

FIG. 2 is a block diagram illustrating a configuration of at least one of the first electronic device 101 and the second electronic device 102 according to an embodiment of the present invention. Hereinafter, for convenience of description, the first electronic device 101 and the second electronic device 102 are referred to as an electronic device, and reference number '100' is allocated to the electronic device. The electronic device 100 described below is at least one of the first electronic device 101 and the second electronic device 102.

Referring to FIG. 2, the electronic device 100 includes a communication module 110, an input module 120, an audio processing module 130, a display module 140, a storage unit 150, a control module 160 and a camera 170. Herein, the term "module" refers to a component for performing a function of the electronic device 100, and is embodied as hardware or a combination of hardware and software executable by a processor.

The communication module 110 supports a communication function of the electronic device 100. Such a communication module 110 receives video call reception data from another electronic device in a process of performing the video call, and transmits video call transmission data generated based on the image collected by the camera 170 to the another electronic device. The transmitted and received video call reception data and video call transmission data include an image signal collected by the camera 170 and a sound signal collected by the audio processing module 130.

In a technique of the present invention, the communication module 110 controls to output the video call reception data received from the another electronic device to the display module 140 and not output at least a portion of the image thereof collected by the camera 170 to the display module 140. In this operation, reference information and guide information are provided to the another electronic device so as to determine whether a face included in a counterpart's image is photographed within a predetermined range while the image thereof is not output. Another electronic device also transmits, to a transmitting electronic device, reference information and guide information by which can be referred to such that a face included in an image of a transmitting electronic device is positioned within a predetermined range. Thus, the communication module 110 receives the reference information and the guide information from another electronic device.

The reference information is for defining a position at which the face included in the counterpart's image is displayed. Such reference information will be described below, and the reference information is a predetermined image element, such as predetermined marking information or a dotted line shape displayable on the display module 140. Alternatively, the reference information is a shape of a letter, a special letter, or a figure understandable by a speaker. The guide information guides such that the face included in the counterpart's image is positioned in an area defined in the reference information when the face included in the counterpart's image leaves from the area defined by the reference information. The guide information is also a predetermined image element or a letter shape. The reference information is provided once at a time point when an initial video call is performed. Alternatively, the reference information is transmitted in real time or in a predetermined time period.

The guide information is transmitted to the counterpart electronic device in an event manner when the face area of the counterpart leaves from the area defined in the reference information as described above. When the communication module 110 receives at least one of the reference information and the guide information, the communication module 110 transfers at least one of the reference information and the guide information to the control module 160. The control module 160 controls to output at least one of the reference information and the guide information to the display module 140.

The above-mentioned communication module 110 includes at least one communication module in order to support at least one communication manner capable of supporting the video call. For example, the communication module 110 includes at least one communication module capable of supporting communication manners of various generations such as 2nd Generation (2G), 3rd Generation (3G) and 4th Generation (4G). The control module 160 activates the communication module 110 according to a request of a user, and supports to form a communication channel according to a requested service kind. In this process, the communication module 110 supports a forming of a communication channel according to an item of which activation is requested by the user.

The input module 120 is a configuration generating various input signals necessary to operate the electronic device 100. The input module 120 is formed with a specific key shape such as a button key, a side key and a home key, or is provided as a virtual touch pad in order to support a full touch screen. The virtual touch pad is displayed on the display module 140 and generates an input signal according to a touch of the user. The input module 120 may generate an input signal requesting the video call and an input signal accepting the received video call request, according to the request of the user. Self-image output omission function provided in an embodiment of the present invention is applied as a default in a video call function to be provided. Alternatively, the self-image output omission function is provided in a predetermined mode. When the self-image output omission function is provided as the predetermined mode, for example a speaker image omission mode, the input module 120 may generate an input signal for activating or deactivating the speaker image omission mode.

In addition, since a speaker image omission function is implemented in various types, the speaker image omission mode may provide items enabling the user to select various types. Therefore, the electronic device 100 performs an image omission function according to the selected item. As an embodiment, the speaker image omission mode includes an adaptive display mode displaying a self-image in an area other than a face area of a received image in a predetermined size, an intermittent display mode outputting the self-image in a predetermined interval during a predetermined time, a temporary display mode outputting the self-image during an initial predetermined time and omitting the output of the self-image after the predetermined time, and an information display mode displaying only reference information, informing, in a display module, of the self-image to be displayed in another electronic device. The information display mode includes a function of displaying the guide information such that the self-image is positioned in a reference area defined in the reference information.

The audio processing module 130 is a configuration processing various audio signals generated in a process of operating a terminal. For example, the audio processing module 130 includes a speaker in order to support an output of the audio signal generated or decoded from the electronic device 100. In addition, the audio processing module 130 includes a microphone capable of collecting an audio signal in order to support a voice call or a video call function, and a recording function. The audio processing module 130 may support an output of various guide sounds or sound effects for operating the camera 170. For example, the audio processing module 130 outputs a guide sound or a sound effect related to a situation of a video call request transmission or reception, and a guide sound or a sound effect related to a video call connection. The audio processing module 130, when the speaker image leaves the reference area defined by the reference information in the process of the video call, outputs a guide sound or a sound effect informing of the leaving from the reference area. In addition, the audio processing module 130 outputs a guide sound or a sound effect which warns of the leaving from the reference area of the speaker image and guides a user to move the face area of the speaker to the reference area.

The display module 140 is a configuration outputting various function screens necessary in an operation process of the electronic device 100 of the present invention. That is, the display module 140 may provide various screens according to a set function or a support function of the electronic device 100. For example, the display module 140 outputs a menu screen, at least one icon display screen, at least one widget display screen, an idle screen, and a lock screen. The display module 140 outputs at least one screen among a phone screen or a dial screen for arranging a video call connection, a video call connection request transmission screen, a video call connection request reception screen, and a video call connection screen. The video call connection screen outputs a screen including only an image received from the counterpart or output a screen where at least a portion of the speaker image is omitted, according to a specific speaker image omission mode set as a default or a specific speaker image omission mode selected depending on a user's setting in the electronic device 100. At least a portion of the speaker image is at least a portion of an area where the speaker image is displayed or at least a portion of time when the speaker image is displayed. Various screen interfaces of the video call connection screen will be described in detail with reference to a drawing described later herein.

The storage unit 150 stores various programs necessary in an operation of the electronic device 100, and various data generated in the operation of the electronic device 100. For example, the storage unit 150 stores programs including an operating system required for the operation of the electronic device 100. The storage unit 150 stores information recorded during the video call. The storage unit 150 stores the reference information and the guide information. The stored reference information and the guide information are referred to when the speaker image omission function is performed during the video call. The storage unit 150 stores a face recognition processing module, which includes routines capable of recognizing a face in counterpart video call data. To this end, the face recognition processing module is loaded on the control module 160 to be operated.

The camera 170 is activated according to the control of the control unit 160 when the video call is operated. The camera 170 may acquire an image from the input module 120 or the display module 140 of an input function, or acquire the image according to an event occurrence, and provides the acquired image as a preview image to the control module 160. Alternatively, when the electronic device 100 is designed such that the camera 170 provides an original image to the control module 160, the control module 160 generates the preview image by using the original image provided from the camera 170. The camera 170 includes a lens, an aperture, a memory and an image processing module for an image photographing.

The control module 160 is a configuration for controlling for example, a signal flow, a data process, collection and transmission of information of the electronic device 100 for the speaker image omission function according to an embodiment of the present invention. The control module 160 controls a process of an image collected by the camera 170, a transmission of the collected image, a partial output of the collected image, an output of the reference information and an output of the guide information. In addition, the control module 160 outputs the counterpart video call data received through the communication module 110. The control module 160 controls a transmission of the reference information or the guide information generated in correspondence to the received counterpart video call data. To this end, the control module 160 includes a configuration as illustrated in FIG. 3.

Figure 3:
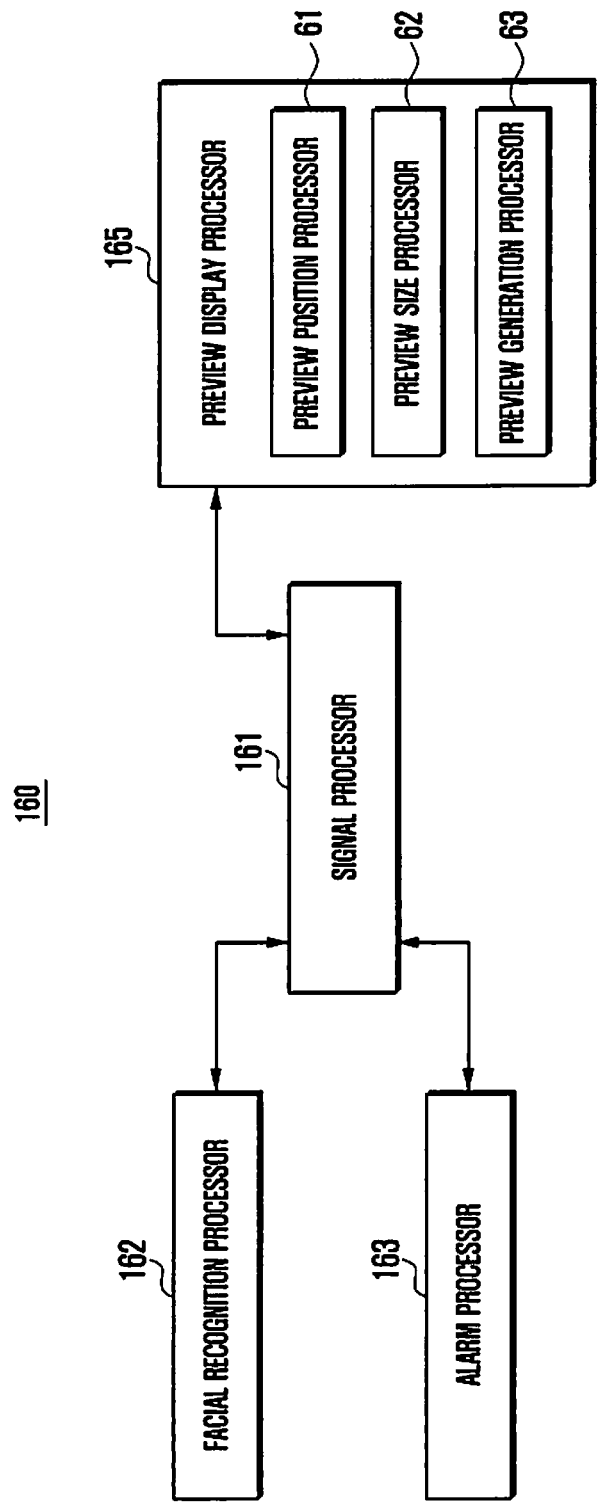
FIG. 3 illustrates a configuration of a control module in the configuration of the electronic device according to an embodiment of the present invention in more detail.

FIG. 3 illustrates a configuration of the control module 160 according to an embodiment of the present invention.

Referring to FIG. 3, the control module 160 includes a signal processor 161, a facial recognition processor 162, an alarm processor 163, and a preview display processor 165.

The signal processor 161 processes a signal related to the operation of the electronic device 100. For example, when the signal processor 161 receives an input signal requesting the video call connection from the display module 140 of the input function, the signal processor 161 controls a message transmission requesting the video call connection with another electronic device by controlling the communication module 110. When the signal processor 161 receives the video call connection request from the another electronic device, the signal processor 161 outputs an alarm message for informing of the reception of the video call connection request, through at least one of the display module 140 and the audio processing module 130. When an input signal corresponding to a video call connection acceptance is generated, the signal processor 161 transmits a video call connection acceptance message to another electronic device through the network device 200, and performs the video call connection. The signal processor 161 activates the camera 170 during the process of the video call connection. Alternatively, the signal processor 161 activates the camera 170 when the video call is connected. When the camera 170 acquires and provides an image, the signal processor 161 may provide the image to the facial recognition processor 162 or the preview display processor 165, for example.

The facial recognition processor 162 recognizes the counterpart's face area from counterpart image data received by the communication module 110. The facial recognition processor 162 transfers counterpart face recognition value including a position value of the recognized face area and a size value of the face area to the signal processor 161. As another embodiment, the facial recognition processor 162 recognizes a face area thereof from the image collected by the camera 170. The facial recognition processor 162 transfers a speaker's face recognition value including a position value of the face area thereof and a size value of the face area to the signal processor 161. The signal processor 161 transfers the face recognition value received from the facial recognition processor 162 to the alarm processor 163 and the preview display processor 165. The electronic device 100 is designed such that the face recognition value is directly transferred to at least one of the alarm processor 163 and the preview display processor 165 without being transferred to the signal processor 161.

When the alarm processor 163 receives at least one of the counterpart face recognition value and the speaker's face recognition value from the signal processor 161 or the facial recognition processor 162, the alarm processor 163 determines whether the alarm processor 163 generates an alarm based on the reference information. For example, when the face area leaves from the predetermined area defined in the reference information by a range equal to or greater than the predetermined range, the alarm processor 163 determines that the alarm processor 163 generates the alarm. When the alarm generation related to the speaker's face recognition value is determined, the alarm processor 163 controls at least one of the output of the alarm or the output of the guide information. The output of the alarm and the output of the guide information is performed through the display module 140. In addition, the output of the alarm and the output of the guide information are performed through the audio processing module 130 or a vibration module. When the alarm generation related to the counterpart face recognition value is determined, the alarm processor 163 controls to transmit at least one of the alarm and the guide information to another electronic device. Then, another electronic device outputs at least one of the received alarm, guide sound and a guide information through an output means such as the display module, the audio processing module, or the vibration module.

The preview display processor 165 includes a preview position processor 61, a preview size processor 62 and a preview generation processor 63. When the electronic device 100 supports a function of temporarily outputting the speaker image, the preview display processor 165 is included in the control module 160. Therefore, when the electronic device 100 does not support the speaker image output, the preview display processor 165 is omitted. The preview display processor 165 controls to output a preview image collected and provided from the camera 170 to one side of the display module 140. Specifically, the preview display processor 165 adjusts the size and the position of the speaker image so that the speaker image does not overlap a predetermined area of the counterpart image data.

The preview position processor 61 controls to output the speaker image to an area other than the predetermined area of the counterpart image data output to the display module 140. To this end, the preview position processor 61 receives a position value of a specific area, for example the face area, among the counterpart image data from the facial recognition processor 162. In addition, the preview position processor 61 determines the specific area within the area other than the counterpart face area as an area where the speaker image is to be output. In an embodiment, the preview position processor 61 selects a position where the speaker image of a predetermined shape is most largely disposed. The predetermined shape may be quadrangular or polygonal such as triangular, hexagonal, octagonal, or oval shape.

Alternatively, the preview position processor 61 checks the size of the speaker image defined in the preview size processor 62, and selects the position where the speaker image of the corresponding size is disposed. When a plurality of positions are included in the position where the speaker image of the predetermined size is disposed, the preview position processor 61 randomly selects a predetermined position, selects a specific position designated by a user, or selects a position where a previous speaker image has been output. When there is no position where the speaker image of the predetermined size can be disposed, the preview position processor 61 selects the largest position among a position where the speaker image can be disposed, and transfers the position to the preview size processor 62.

The preview size processor 62 adjusts the size of the speaker image. When the counterpart face area is analyzed based on the counterpart image data, the preview size processor 62 determines the speaker image size corresponding to the largest area within the area other than the face area. Alternatively, the preview size processor 62 determines the speaker image size of the predetermined size.

When the position and the size of the speaker image are determined by the preview position processor 61 and the preview size processor 62, the preview generation processor 63 generates a preview speaker image having the corresponding size to be output to the corresponding position according to the determined values. In addition, the preview generation processor 63 controls an output of the preview speaker image such that the preview speaker image is output to the corresponding position and has the corresponding size. When an input event for removing the speaker image is generated, the preview generation processor 63 removes the speaker image in the display module 140. Then, the signal processor 161 may configure a screen with only the counterpart image data, in which the speaker image is removed.

When an event requesting the output of the speaker image is generated in the process of the output of only the counterpart image data in which the speaker image is removed, the preview display processor 165 controls to re-output the speaker image during a predetermined time. Alternatively, the preview display processor 165 controls to output the speaker image in a predetermined time interval during a predetermined time.

Figure 4:
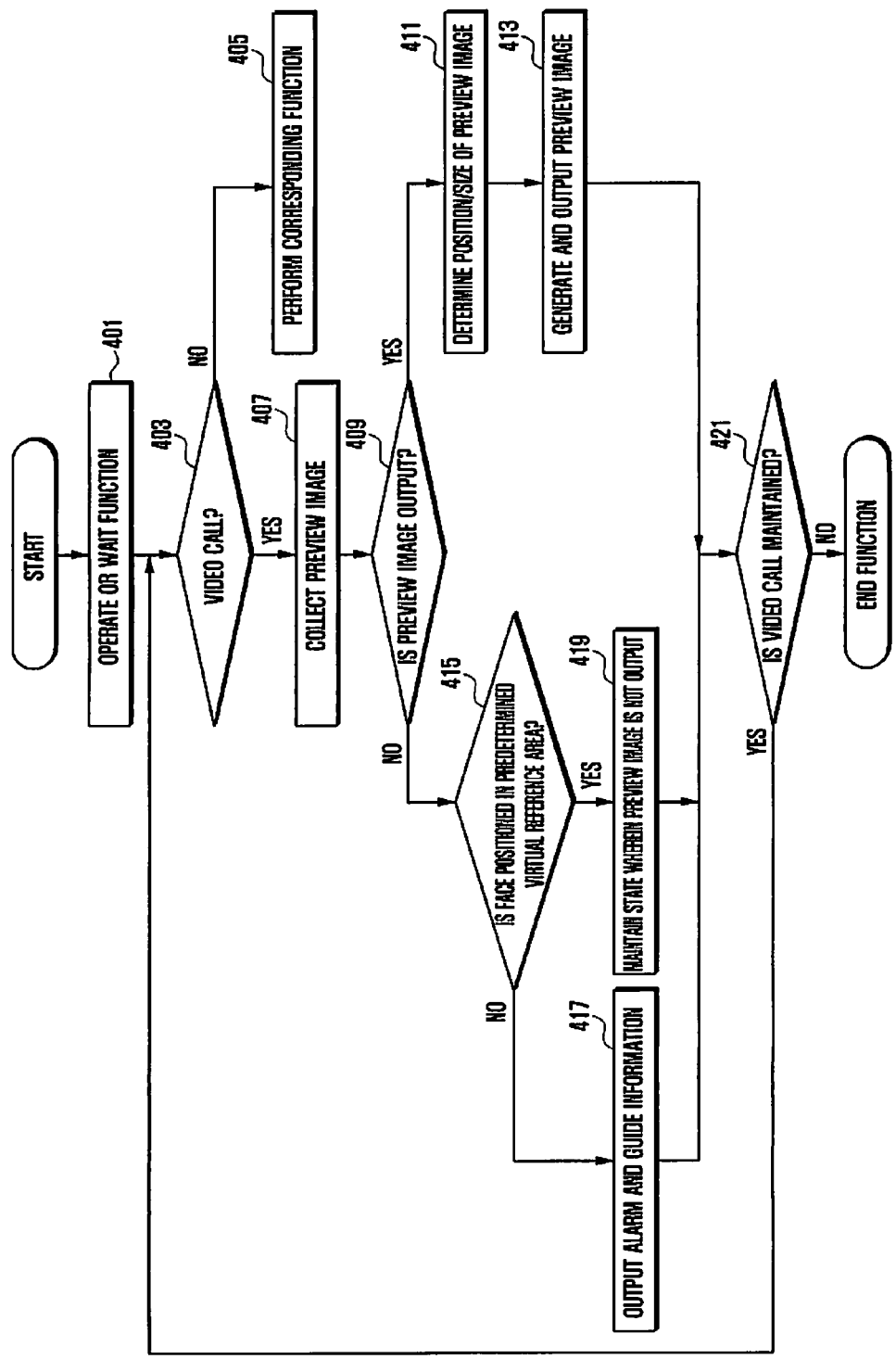
FIG. 4 illustrates an operation method of the electronic device according to an embodiment of the present invention.

FIG. 4 is a flowchart for describing a video call method according to an embodiment of the present invention.

Referring to FIG. 4, the control module 160 performs a process for a function operation or a function waiting in step 401. For example, the control module 160 performs such that a previously active user function, for example, a music playing function, supports a function operation or a function waiting of a moving picture playing function, web access and surfing functions, and a broadcast receiving function.

When a specific event is generated, the control module 160 determine whether the corresponding event is for the video call in step 403. When the event is not the video call event in step 403, the control module 160 controls a function performance according to the corresponding event characteristic in step 405. For example, the control module 160 controls function performances such as adjusting a volume of the electronic device 100 according to the event characteristic, and activating a specific user function or ending the activated function according to the corresponding event.

When the event for the video call is generated in step 405, the control module 160 collects a preview image in step 407. To this end, the control module 160 controls a calling function for the video call connection, or processes an event generation accepting the video call connection reception. The control module 160 activates the camera 170, and process the preview image acquired through the camera 170.

In the process of the preview image, the control module 160 determines whether the process for outputting the preview image is necessary in step 409. When the process for outputting the preview image is necessary, the control module 160 determines the position and size of the preview image in step 411. The control module 160 recognizes the counterpart face area from the counterpart image data, and determines the position and size of the preview image to be output to the area other than the corresponding face area. The control module 160 controls to generate the preview image to be displayed in the determined position and having the determined size, and controls to output the generated preview image to the display module 140. Therefore, the preview image of the speaker is output in a predetermined size, in an area not overlapping the counterpart face area on a screen including the counterpart image data.

When the preview image output of the speaker is not set or an event requesting a removal of the preview image output of the speaker is generated in step 409, the control module 160 determines whether the speaker's face is positioned in a predetermined virtual reference area in step 415. When the speaker's face is not positioned in the predetermined reference area, the control module 160 controls the output of the alarm and the guide information in step 417. When the speaker's face is positioned in the reference area in step 415, the control module 160 controls to maintain the preview image as not being output, in step 419.

Further in step 415, when the speaker's face is not positioned in the reference area, the control module 160 controls to output at least one of the alarm and the guide information to the display module 140 of the electronic device 100 in step 417. When the speaker's face is positioned in the reference area, the control module 160 controls so as not to output the speaker image to the display module 140. The operation of the determining whether the speaker's face is positioned in the reference area is performed through background processing. Therefore, the speaker image may not be output to the display module 140 in the corresponding operation process.

As another embodiment, the control module 160 determines whether the face area of the counterpart image data provided from another electronic device is positioned in the reference area in step 415. When the counterpart face area is not positioned in the reference area, the control module 160 controls to output the alarm and the guide information to another electronic device in step 417. Then, another electronic device outputs at least one of the received alarm and the guide information to the display module. When the counterpart face area is positioned in the reference area, the control module 160 does not transmit the alarm and the guide information to another electronic device. Therefore, another electronic device maintains the preview image as not being output, in step 419.

When a video call maintaining is required in step 421, the control module 160 may progress to step 403, and perform the operations below step 403 to control the support of the video call service. When an event for ending the video call is generated in step 421, the control module 160 controls to end the video call.

Figure 5:
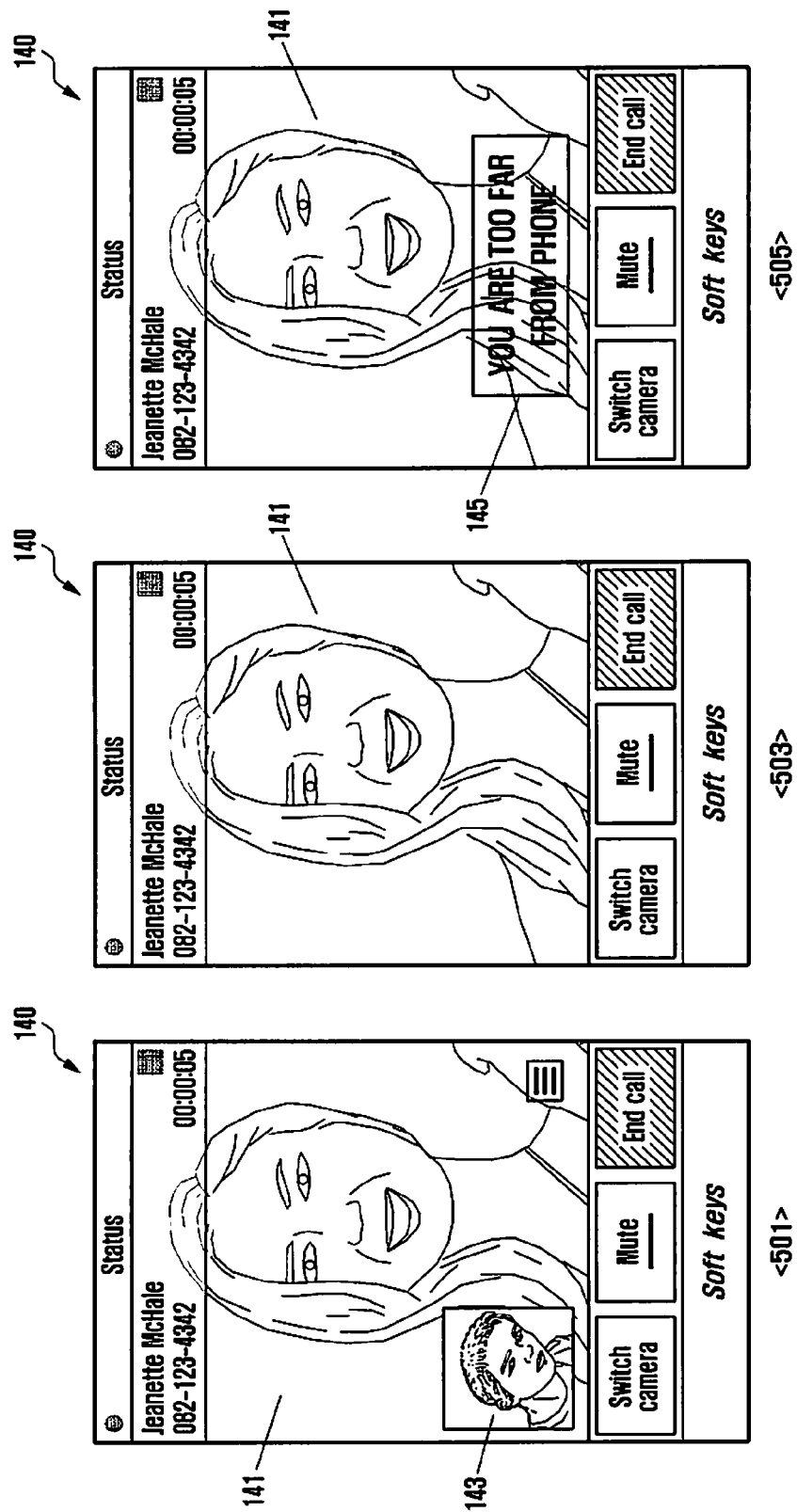
FIG. 5 illustrates an example of a screen interface depending on a speaker omission function according to an embodiment of the present invention.

FIG. 5 illustrates an embodiment of a screen interface of an electronic device to which the video call function according to an embodiment of the present invention is applied.

Referring to FIG. 5, when a video call connection request is generated and a video call channel with another electronic device is formed, the control module 160 of the electronic device 100 controls to activate the camera 170.

The control module 160 controls to output counterpart image 141 generated on the basis of the counterpart image data provided from another electronic device to the display module 140, and outputs a speaker's preview image 143 acquired by the camera 170 to the display module 140. The control module 160 outputs the counterpart image 141 on a entire screen, and overlays the speaker's preview image 143 on the counterpart image 141 to output the speaker's preview image 143. Therefore, the display module 140 includes a layer where the counterpart image 141 is displayed, a layer where the speaker's preview image 143 is displayed, and a layer where a menu item is displayed.

The speaker's preview image 143 has a predetermined size, and is displayed in a predetermined position. The predetermined size is smaller than the size of the counterpart image 141. Alternatively, the speaker's preview image 143 is output to an area other than a face area of the counterpart image 141. A screen 501 illustrates that the speaker's preview image 143 is output to a lower-left area which does not overlap the face area of the counterpart image 141. The position of the speaker's preview image 143 in the screen 501 is a previously set position or a position selected so as not to overlap the face area of the counterpart image 141. When the position of the speaker's preview image 143 is selected so as not to overlap the face area of the counterpart image 141, the position of the speaker's preview image 143 is changed in real time as a movement of the face area of the counterpart image 141.

After the video call connection is performed, the speaker's preview image 143 is output during a predetermined time, and is removed in the display module 140 as a screen 503. Therefore, the screen 503 includes the counterpart image 141 and the menu item for the video call support. The display module 140 includes only the layer where the counterpart image 141 is displayed and the layer where the menu item is displayed. In the display module 140 of the screen 503, a change of a layout is generated according to the removal of the speaker's preview image, compared with the screen 501. The electronic device 100 of the present invention removes the speaker's preview image 143, thereby improving current consumption for the corresponding layer implementation.

The menu item is variably configured according to a video call support manner. For example, when the electronic device 100 includes a plurality of cameras, the menu item includes a "Switch camera" item enabling a user to select one camera among the plurality of cameras. The "Switch camera" item is for selecting at least one camera to be used for the video call, among the plurality of cameras, or an item for instructing an image acquisition using another camera except for a camera presently acquiring an image. Alternatively, the "Switch camera" item is for instructing an image acquisition by operating the plurality of cameras simultaneously. When the plurality of cameras is operated simultaneously, for example, when a front camera and a rear camera are operated simultaneously, the electronic device 100 collects a front image and a rear image simultaneously, and transmits the simultaneously collected images to another electronic device. A "Mute" item is capable of limiting an audio signal process during the video call. When the "Mute" item is activated, an audio signal collection is limited, or an output of an audio signal provided from another electronic device is limited. An "End call" item is for instructing a video call ending. When the "End call" item is selected, the electronic device 100 ends the video call, and controls to convert from the video call to a voice call automatically according to a video call setting.

The control module 160 recognizes the face area by analyzing the speaker's preview image collected through the camera 170 during the video call such as the screen 503. In addition, the control module 160 determines whether the recognized speaker's face area leaves from the reference area defined in the reference information. The control module 160 compares the reference area with the position of the speaker's face area by using the background processing, and thus controls not to output the speaker's face area and to output only the counterpart image 141 to the display module 140 as the screen 503. When the speaker's face area leaves from the reference area, the control module 160 outputs an alarm message 145 as a screen 505. A user adjusts a position relation with the camera 170 by checking the alarm message 145 as illustrated in the screen 505. For example, when it is impossible to recognize a face or the size of the recognized face area is smaller than a reference value because a speaker is too far from the electronic device 100, the electronic device 100 outputs the alarm message 145 depending on the corresponding situation. Such an alarm message 145 is output as a guide sound or is implemented with a specific vibration pattern using a vibration module.

The control module 160 of the electronic device 100 controls to output the speaker's preview image to the display module rather than output the alarm message 145. That is, when the face area in the speaker's preview image leaves from the reference area, the control module 160 controls to output the speaker's preview image which has left the reference area to the display module 140. Alternatively, the control module 160 outputs the speaker's preview image after outputting the alarm message 145, and thus the control module 160 enables the user to determine whether the user is properly photographed.

Figure 6:
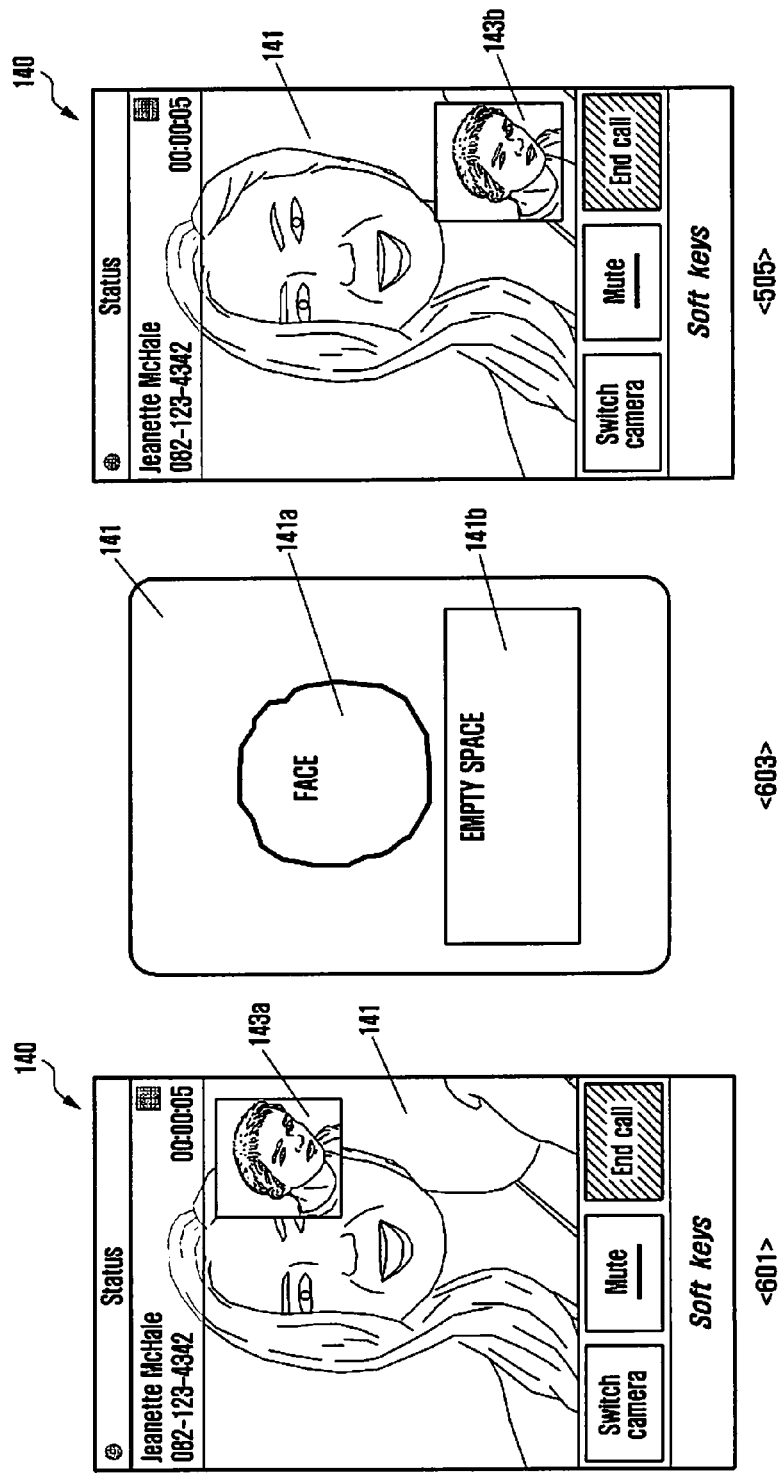
FIG. 6 illustrates an example of a screen interface to which adjustments of a position and a size of a preview image are applied according to an embodiment of the present invention.

FIG. 6 illustrates another example of a screen interface of an electronic device to which the video call function according to an embodiment of the present invention is applied.

Referring to FIG. 6, when the video call connection is performed, the electronic device 101 of the present invention forms a screen, such as a screen 601, including the counterpart image 141 provided from another electronic device and a speaker's preview image 143a collected by the camera 170. The speaker's preview image 143a is to be displayed in a position set as a default and having a size set as a default. The speaker's preview image 143a is displayed in the position selected as a default regardless of the face area of the counterpart image 141. Thus, the speaker's preview image 143a overlaps at least a portion of the face area of the counterpart image 141.

When the speaker image omission function is set or an event for requesting the speaker image omission function is generated, the control module 160 analyzes the counterpart image 141. For example, the control module 160 classifies a face area 141a and an empty space area 141b in the counterpart image 141 as a screen 603.

Then, the control module 160 controls to output a speaker's preview image 143b to the empty space area 141b as a screen 605. When the empty space area 141b is larger than the speaker's preview image 143b, the control module 160 controls to output the speaker's preview image 143b to a random area or a specific area among the areas where the previous speaker's preview image is displayed. When the empty space area 141b is smaller than the speaker's preview image 143b, the control module 160 controls to output the speaker's preview image 143b after adjusting the size of the speaker's preview image 143b in correspondence to the empty space area 141b.

When the speaker's image omission function is set before the video call connection, the electronic device 100 does not output the speaker's preview image 143a as a screen 601. In addition, the electronic device 100 controls to output the speaker's preview image to an initial screen of the video call connection as the screen 605.

Figure 7:
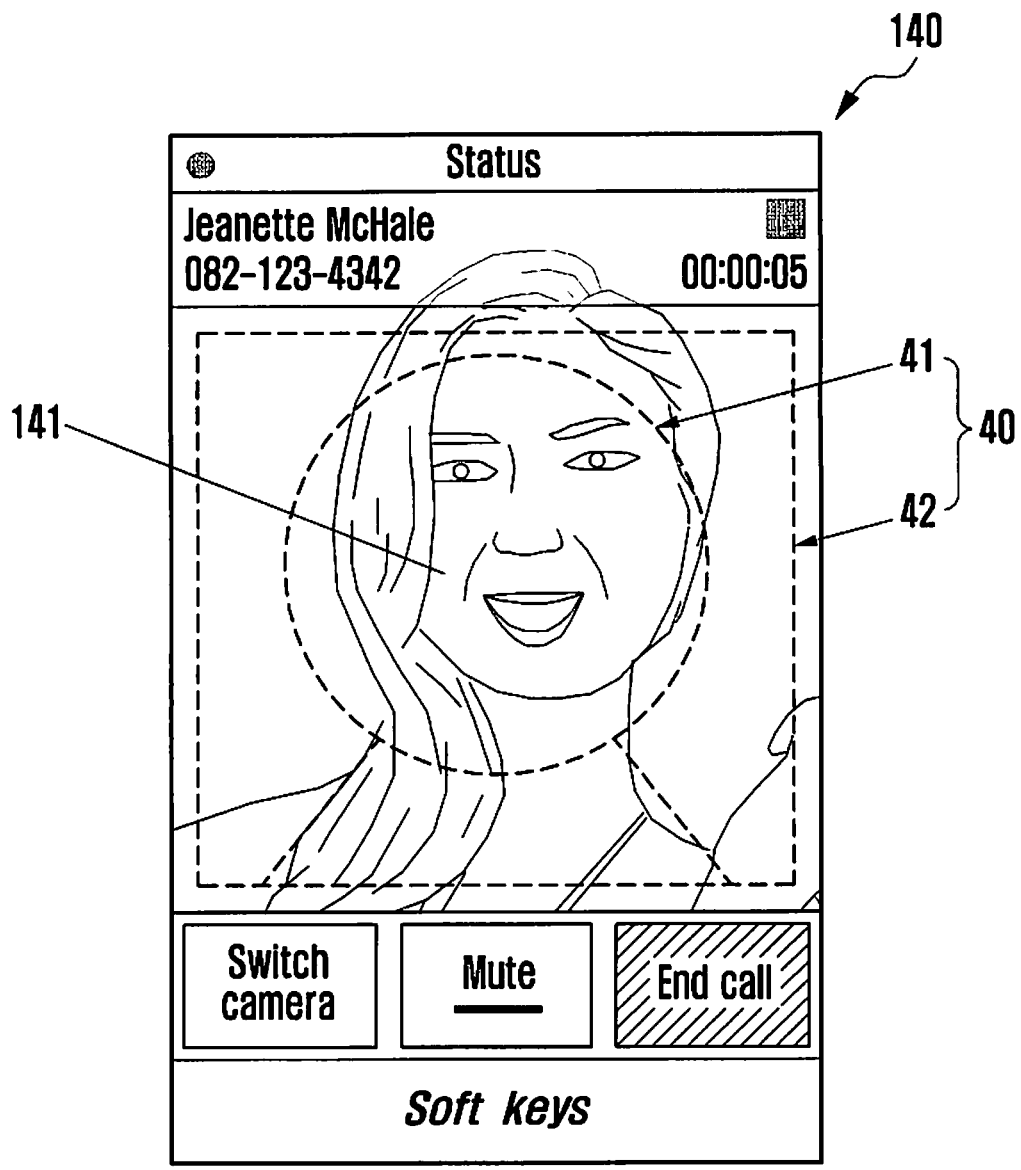
FIG. 7 illustrates an example of a screen interface to which a reference area and a guide area are applied according to an embodiment of the present invention.

FIG. 7 illustrates a screen interface to which the guide information of the electronic device supporting the video call function according to an embodiment of the present invention is applied.

Referring to FIG. 7, when the video call channel with another electronic device is formed, the control module 160 of the electronic device 100 receives the counterpart image data from another electronic device and form a screen. The control module 160 extracts the counterpart image 141 from the counterpart image data and outputs the counterpart image 141 to the display module 140. The control module 160 controls to output an audio signal included in the counterpart image data through the audio processing module 130. When the speaker image omission function is set or the activation of the speaker image omission function is requested, the control module 160 outputs a speaker image subsidiary area 40 as illustrated. The speaker image subsidiary area 40 includes a reference area 42 and a guide area 41.

The reference area 42 is defined so that the speaker's face area defined in the reference information is positioned therein. The reference area 42 may indicate a range of an image acquired by the camera 170. The guide area 41 is corresponds to the speaker's face area in the image acquired by the camera 170. Predetermined areas of the reference area 42 and the guide area 41 are displayed as a dotted line in the speaker's preview image as illustrated, so as to minimize a disturbance of a recognition of the counterpart image 141. For example, the face area in the preview image is displayed as a dotted line. Alternatively, a boundary between a background and the speaker is displayed as a dotted line. In addition, the reference area 42 and the guide area 41 are minimum image information capable of minimizing a disturbance of the recognition of the counterpart image 141.

As described above, the control module 160 performs at least one of outputting an area corresponding to a border of the face area in the speaker's preview image as a guide area of a dotted line shape, outputting an area corresponding to a boundary line between a background image and a subject of the speaker in the speaker's preview image as a guide area of a dotted line shape, and outputting an area corresponding to a border of the speaker's preview image as a reference area of a dotted line shape.

Even though the speaker's preview image is not displayed on the display module 140, the user instinctively knows the position of the speaker's face through a position check of the guide area 41 in the reference area 42. Thus, the user performs an operation for a position relation with the camera 170 such that the guide area 41 does not leave the reference area 42.

When the guide area 41 leaves the reference area 42 by an amount equal to or greater than a predetermined amount, the control module 160 outputs the alarm message or the guide information. At least one of the alarm message and the guide information is output through at least one of the display module 140, the audio processing module 130 and the vibration module (not shown).

The above-mentioned reference area 42 and the guide area 41 are output to the display module in a time point when the video call request is generated. Alternatively, the reference area 42 and the guide area 41 are output to the display module from a time point when the video call connection is performed. At least one of the reference area 42 and the guide area 41 is continuously output during the video call connection. Alternatively, the reference area 42 and the guide area 41 are output when the face area in the speaker's preview image corresponding to the guide area 41 leaves the reference area 42 by a predetermined amount. In this case, the guide area 41 which has left a border of the reference area 42 by the predetermined amount is output to the display module 140. When the guide area 41 is positioned in a predetermined range of the reference area 42 or when a predetermined time is elapsed after the guide area 41 is positioned in the predetermined range of the reference area 42, at least one of the reference area 42 and the guide area 41 is removed in the display module 140.

Figure 8:
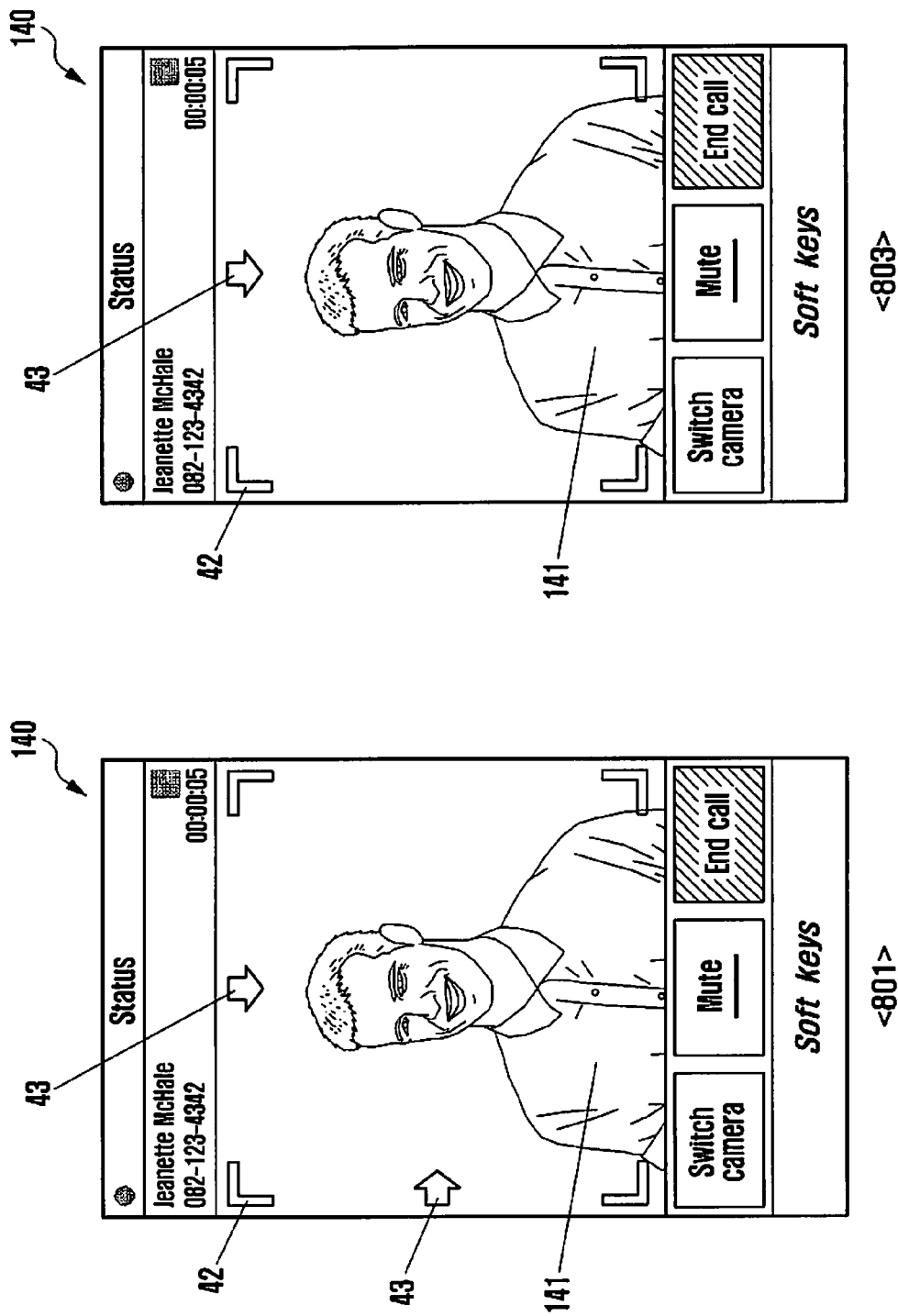
FIG. 8 illustrates an example of a screen interface to which a reference area and guide information are applied according to an embodiment of the present invention.

FIG. 8 illustrates a screen interface to which the guide information of the electronic device supporting the video call function according to an embodiment of the present invention is applied.

Referring to FIG. 8, when the video call channel with another electronic device is formed, the control module 160 of the electronic device 100 receives the counterpart image data from another electronic device and outputs the counterpart image data to the display module 140. The control module 160 extracts the counterpart image 141 from the counterpart image data and forms a screen.

When the speaker image omission function is set or an event for an activation of the speaker image omission function is generated, the control module 160 determine whether the speaker's face area of the speaker's preview image is positioned in the reference area 42. The control module 160 determines whether the speaker's face area does not leave the reference area 42 when the reference area 42 is not displayed to the display module 140, through the background processing. When the speaker's face area leaves the reference area 42, the control module 160 outputs guide information 43 as a screen 801 or a screen 803.

The screen 801 exemplifies a situation wherein the guide information 43 inducting a movement of the speaker in a lower-left direction is output when the speaker's face area leaves the reference area 42 in an upper-right direction. The screen 803 illustrates a situation wherein the guide information 43 inducing a movement of the face area of the speaker in an upper direction is output when the speaker's face area leaves the reference area 42 in a lower direction. The user adjusts the direction and the position of the face with respect to the camera 170 based on the above-mentioned guide information 43. Thus, although the speaker's preview image is not displayed on the display module 140, the electronic device 100 transmits the speaker's image including the entire face area to counterpart electronic device.

When the face area of the counterpart image 141 leaves the reference area 42 by a predetermined amount, the electronic device 100 transmits the guide information corresponding to the leaving from the reference area 42 to another electronic device 100. Thus, the screen 801 and the screen 803 illustrated in FIG. 8 is a screen output to a display module of the counterpart electronic device.

The above-mentioned electronic device 100 may further include various and additional modules according to their type. That is, the electronic device may further include configurations such as a short-range communication module for short-range communication, an interface for a transmission and reception of data by a wired communication scheme or a wireless communication scheme of the electronic device, an Internet communication module for communication with the Internet network to perform the Internet function, a digital broadcasting module for receiving and reproducing digital broadcasting, and the like, which are not described above. These elements could be variously modified according to the convergence trend of digital devices, and are not enumerated in sum. However, the electronic device 100 may further include elements equivalent to the above-described elements. In the electronic device of the present invention, specific structural elements are excluded from the above-mentioned configuration or substituted with other structural elements according to their type. This is easily understood by those skilled in the art to which the present invention pertains.

In addition, the electronic apparatus according to an embodiment of the present invention includes all information and communication devices and multimedia devices such as a Portable Multimedia Player (PMP), a digital broadcasting player, a Personal Digital Assistant (PDA), a music player (for example, an MP3 player), a portable game terminal, a smart phone, a laptop computer, and a handheld Personal Computer (PC) and application devices thereof as well as all mobile communication terminals operating based on communication protocols corresponding to various communication systems.

Although embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention belongs that other modifications can be established without departing from the technical spirit of the present invention.

What is claimed is:

1. A video call method, comprising:
    forming a video call channel in an electronic device;
    outputting a screen including a first image received through the video call channel;
    extracting at least one face in a second image, which is acquired by a camera unit of the electronic device and is transmitted through the video call channel; and
    displaying the screen without the second image based on information on the at least one face and a predetermined threshold.

2. The method of claim 1, further comprising at least one of:
    recognizing a face area of the first image and outputting the second image to an area other than the face area of the first image, and
    determining a position and a size of the area other than the face area of the first image and adjusting the second image in correspondence to the position and the size.

3. The method of claim 1, further comprising:
    outputting at least one of an alarm message and guide information when a face area of the second image leaves a predetermined reference area in a screen where the second image is removed, the alarm message informing of leaving the predetermined reference area, and the guide information guiding such that the face area of the second image is positioned in the reference area.

4. The method of claim 1, wherein outputting the screen comprises at least one of:
    outputting an area corresponding to a border of a face area in the second image as a guide area of a dotted line shape;
    outputting an area corresponding to a boundary between a background image and a subject in the second image as the guide area of the dotted line shape; and
    outputting an area corresponding to a border of the second image as a reference area of the dotted line shape.

5. The method of claim 1, further comprising:
    receiving at least one of an alarm message and guide information, the alarm message being generated when a face area of the second image leaves a predetermined reference area by a predetermined distance, and the guide information guiding such that the face area of the second image is positioned in the reference area.

6. The method of claim 1, wherein outputting the screen comprises:
    simultaneously outputting the first image and the second image; and
    outputting a screen including the first image and not including the second image after a predetermined time.

7. The method of claim 1, further comprising:
    recognizing a face area included in the first image; and
    transmitting at least one of an alarm message and guide information when the face area of the first image leaves a predetermined reference area by a predetermined distance, the alarm message informing of the leaving the predetermined reference area.

8. A video call method, comprising:
    forming a video call channel in an electronic device;
    outputting a screen including a first image received through the video call channel;
    determining a display position of a second image being transmitted through the video call channel based on image information of the first image;
    displaying the second image in the determined position; and
    determining whether a face area of the second image leaves a reference area, through background processing.

9. An electronic device, comprising:
    a communication module configured to form a video call channel;
    a display module configured to output a screen including a first image received based on the video call channel; and
    a control module configured to extract at least one face in a second image, which is acquired by a camera unit of the electronic device and is transmitted through the video call channel, and control the display module to output the screen without the second image based on information on the at least one face and a predetermined threshold.

10. The electronic device of claim 9, wherein the control module is further configured to control to output a screen where at least a portion of the second image is removed or the second image is not displayed during at least a predetermined time.

11. The electronic device of claim 10, wherein the control module is further configured to control at least one of:

outputting the second image to an area other than a face area of the first image after recognizing the face area of the first image, and determining a position and a size of the area other than the face area of the first image and adjusting the second image in correspondence to the position and the size.

12. The electronic device of claim 9, wherein, when a face area of the second image leaves a predetermined reference area in a screen where the second image is removed, the display module outputs at least one of an alarm message informing of the leaving the predetermined reference area, and guide information guiding such that the face area of the second image is positioned in the reference area.

13. The electronic device of claim 9, wherein the display module is further configured to output at least one of:
   a guide area of a dotted line shape corresponding to a border of a face area in the second image;
   a guide area of a dotted line shape corresponding to a boundary between a background image and a subject in the second image; and
   a reference area of a dotted line shape corresponding to a border of the second image.

14. The electronic device of claim 9, wherein the communication module is further configured to receive at least one of an alarm message generated when a face area of the second image leaves a predetermined reference area by a predetermined distance, and guide information guiding such that the face area of the second image is positioned in the reference area.

15. The electronic device of claim 14, wherein the display module is further configured to simultaneously output the first image and the second image, and outputs a screen including the first image and not including the second image after a predetermined time.

16. The electronic device of claim 9, wherein the control module is further configured to control to recognize a face area included in the first image, and, when the face area of the first image leaves a predetermined reference area by a predetermined distance, transmit at least one of an alarm message and guide information informing of the leaving from the predetermined reference area.

17. An electronic device comprising:
   a communication module configured to form a video call channel;
   a control module configured to determine a display position of a second image being transmitted through the video call channel based on image information of a first image received through the video call channel, and to determine whether a face area of the second image leaves a reference area, through a background processing; and
   a display module configured to display the second image in the determined position.

18. The electronic device of claim 17, wherein the display module is further configured to output a guide area corresponding to the face area of the second image.

19. The electronic device of claim 17, wherein, when the face area of the second image leaves the reference area, the display module is further configured to output at least one of an alarm message informing of the leaving the reference area, and guide information inducing the face area of the second image such that the face area of the second image is positioned in the reference area.

* * * * *